US008447848B2

(12) United States Patent  
Colantuono et al.

(10) Patent No.: US 8,447,848 B2  
(45) Date of Patent: May 21, 2013

(54) PREPARING EXECUTION OF SYSTEMS MANAGEMENT TASKS OF ENDPOINTS

(75) Inventors: Cristiano Colantuono, Rome (IT); Scot MacLellan, Rome (IT)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 12/091,324

(22) PCT Filed: Aug. 30, 2006

(86) PCT No.: PCT/EP2006/065816
§ 371 (c)(1),
(2), (4) Date: Apr. 24, 2008

(87) PCT Pub. No.: WO2007/048653
PCT Pub. Date: May 3, 2007

(65) Prior Publication Data
US 2008/0288584 A1    Nov. 20, 2008

(30) Foreign Application Priority Data

Oct. 26, 2005 (EP) .................................... 05110040

(51) Int. Cl.
*G06F 15/173* (2006.01)
(52) U.S. Cl.
USPC ............ 709/223; 709/220; 709/221; 709/222
(58) Field of Classification Search
None
See application file for complete search history.

(56) References Cited

U.S. PATENT DOCUMENTS

| | | | |
|---|---|---|---|
| 5,914,879 A * | 6/1999 | Wang et al. .................... | 700/111 |
| 6,047,129 A * | 4/2000 | Frye .............................. | 709/221 |
| 6,901,442 B1 | 5/2005 | Schwaller | |
| 2002/0052950 A1* | 5/2002 | Pillai et al. .................... | 709/224 |
| 2003/0126260 A1 | 7/2003 | Husain | |
| 2004/0199791 A1* | 10/2004 | Poletto et al. ................. | 713/201 |
| 2005/0138167 A1 | 6/2005 | Whitman, Jr. | |
| 2007/0043831 A1* | 2/2007 | Kessler et al. ................ | 709/219 |
| 2007/0094281 A1* | 4/2007 | Malloy et al. ................. | 707/100 |

OTHER PUBLICATIONS

China Office Action, translated, Text of the Notification of the First Office Action, dated Sep. 29, 2010 for Application No. 200680040060X, 4 pages.
China Office Action, untranslated, dated Sep. 29, 2010 for Application No. 200680040060X, 4 pages.

(Continued)

*Primary Examiner* — Thu Nguyen
*Assistant Examiner* — Nam Tran
(74) *Attorney, Agent, or Firm* — Stephen R. Tkacs; Stephen J. Walder, Jr.; Jeffrey S. LaBaw

(57) ABSTRACT

A mechanism is provided for automatically defining on a computer data for execution of systems management tasks on endpoints by a systems manager management said endpoints. The mechanism reads connection/disconnection information related to the endpoints collected by the systems management server during a same period of time for all the endpoints, computes the availability trends with the connection/disconnection information for said same period of time classifying endpoints according to the predefined classes of availability trends for endpoints and the computer availability trends, applies rules to create data defining execution of systems management tasks on endpoints according to the result of the classifying step, and makes these data available to the systems management server.

17 Claims, 12 Drawing Sheets

OTHER PUBLICATIONS

Seraphin Calo et al Guest Editorial.: Policy-Based Management of Networks and Services, Journal of Network and Systems Management, Kluwer Academic Publishers-Plenum Publishers, NE., vol. 11, No. 3. Sep. 1, 2003, pp. 249-252, XP019283538, ISSN: 1573-7705.

Chen G et al: "A Survery of Context—Aware Mobile Computing Research", Internet Citation, (Online) Nov. 30, 2000, XP002227105 URL: http://www1.cs.dartmouth.edu/dlk/page rs/chen:survey-tr.pdf>.

Voldal D.: A Practical Methodology for Inplementing a Patch Management Process: Sans White Paper, Oct. 2003, XP007904427 URL: http://www2.sans.org/reading_room/whitepapers/bestprac/1206.php?portal=dbeBebba790125fb8141246a0e5a0a8c.

Chuan-Wen Chang et al: "A Cross-Site Patch Management Modeli and Architecture Design for Large Scale Heterogeneous Enivornment" Security Technology, 2005, CCST '05, 39th Annual 2005 International Carnahan Conference on Las Palmos, Spain Oct. 11-14, 2005, Pliscataway, NJ, USA IEEE, Oct. 11, 2005, pp. 1-6, XP010894030.

Godambe, Ashok V. et al., "Automated Software Patch Distribution", Xerox Disclosure Journal, vol. 20, No. 4, Jul./Aug. 1995, pp. 361-362.

\* cited by examiner

PREPARING EXECUTION OF SYSTEMS MANAGEMENT TASKS OF ENDPOINTS

FIELD OF THE INVENTION

The present invention generally relates to systems management and more particularly to a method and system to manage endpoint computers and preparing execution of systems management tasks on these endpoints.

BACKGROUND OF THE INVENTION

A systems administrator is tasked with managing systems that are becoming ever more complex and heterogeneous. Tasks include security management, availability and performance management, software distribution and configuration, and many other complex tasks. There is a plethora of systems management products that specialize in specific areas of systems management, and aid the administrator in performing these specific tasks, many of which require the presence of an agent on each managed system. Managed systems of this type are often referred to as 'endpoints' by the systems management vendors, and although the products facilitate the administrator in performing systems management tasks, often the management of the endpoints themselves becomes a significant burden for the administrator.

In particular, centralized systems management generally requires that the endpoints are known to the management servers, and that communication with the endpoints is possible when management tasks are to be performed. For this purpose, many products employ an endpoint registry, where information about all of the endpoints is stored and maintained, and fault-detection mechanisms such as 'heartbeat' are employed to maintain a current picture of the status of the management system. The failure to communicate with an endpoint or the failure of an endpoint to report its health through the heartbeat protocol is assumed to represent a problem that requires attention in order to return the management system to a fully functional state.

In a static environment, the administrator will investigate the reason for detached endpoints, and in the case that the lack of contact is due to a problem, would arrange for the problem to be fixed. If the reason for the lack of communication is due to the retirement of the system, then the endpoint would be removed from the endpoint registry. To facilitate this work, some systems management products provide reports showing endpoints with which contact has been lost. However, systems topology is becoming ever more dynamic, with On Demand computing automatically expanding and contracting systems by adding and removing servers to match the workload. This means that the appearance and disappearance of endpoints is a normal event. Further, the increased use of virtualized environments like VMware (VMware is a trademark of VMware Inc. In the US and/or other countries) means that different system images (and therefore different endpoints) are used depending on the particular requirements of the moment. It is becoming more usual for the administrator to be unable to investigate the reason for losing contact with endpoints, as this would be a never-ending and inefficient task. As a result, endpoints that are retired are not identified, and the endpoint registry does not get cleaned up. The administrator does not therefore understand how many endpoints there are in the system, and the system itself cannot effectively perform management tasks on managed systems. Additionally, if there is a problem with a system that prevents the endpoint from communicating with the management system, then, this is not detected and the endpoint is effectively excluded for ongoing management tasks.

Execution of systems management tasks on endpoint systems raises the problem of being able to predict when endpoints are excluded for ongoing management tasks and when their are accessible for these tasks. For instance, when performing an Inventory scan to collect hardware and/or software information on an endpoint, it is important that the operation has the highest possible potential for success (most systems are running), the scan process does not impact significantly systems performance (do not scan when systems are heavily used) and, finally, the data collection be diluted over a suitable time frame to avoid excessive load on the network and on the database server. All these aspects become critical especially when managing a large number of systems.

There is a need for executing on endpoints systems management tasks such as software distribution, workload scheduling and availability management in the most efficient way.

When software is to be distributed to endpoints, either for the installation of a new product or service, or for applying maintenance (e.g. security patches), it is important that the distribution has the highest possible potential for success and that it is performed in an efficient manner to optimize the action from the point-of-view of the system as a whole. For instance, it is useless to schedule the distribution of software to a 'personal workstation' at night, as it is highly probable that the machine will be disconnected and the distribution will fail. Distribution to these machines needs necessarily to be scheduled during working hours. It is similarly inefficient to schedule the distribution of software to a 'sporadic use' endpoint at a fixed time and day. Such a distribution would most probably fail as the sporadic use endpoint is rarely active. A better approach would be to set up automation to detect when a sporadic use endpoint connects, and to automatically initiate the distribution immediately at a high priority. 'Highly available servers', on the other hand, are almost always connected, and therefore a good policy would be to distribute to these machines at low priority when other workload is not running, and possibly during the 'holes' in which distributions are not taking place to other categories in order to spread out the load on the network.

Although traditional workload schedulers tend to have fixed targets for job execution, some recent developments have explored the possibility of dynamic selection of execution target. This is particularly relevant in a grid computing context where there are many computing systems contributing, sometimes on a "best effort" basis, to a collaborative effort. The selection of the appropriate target will be more accurate if the selection takes into account the category of the potential targets. For instance, an endpoint that connects to the system for only brief periods at a time would be an inappropriate choice for executing a job that has a large expected duration. It is more likely that such a workstation would disconnect before the job completes than if a system with a greater average connect time were selected. If a job to be executed requires repeated runs on the same target, to use data collected and stored on the same system, for instance, then, it would be inappropriate to schedule the first execution of the job on a 'sporadic use' endpoint. The selection of the endpoint should be made from a category where there is greater certainty of finding the endpoint active when successive executions are required. A 'highly available server' would be a more appropriate choice, or a 'personal workstation' if the successive runs are daily, or compatible with the working hours of the system's user.

Availability management concentrates on managing the availability of computing resources in order that they are ready to serve their purpose to the business that they support. Availability management should influence the actions to be taken in the event that a particular endpoint is found to be disconnected. When a 'highly available server' is inactive this is an unusual situation, and worthy of immediate action which could be alerting an operator or executing an automation script to reactivate the machine. If a 'sporadic use' endpoint is found to be inactive on the other hand then this is no big deal, and taking any action, even issuing an event, would simply add clutter and distract from the important events. Of course, if a sporadic use endpoint is inactive for more than, let's say, 5 times its average time between connects, then its behavior has become unusual and an investigation is warranted. A 'personal workstation' may not contribute directly to a business process, and its unavailability even during working hours may simply indicate that the user is on vacation or sick. Again, if the unavailability exceeds a certain limit (number of yearly vacation days), then it may be a clue that some action is necessary. Perhaps the machine is broken and can be removed from the endpoint repository (no use in monitoring endpoints that no longer exist).

The US patent application US2005/0138167 having as title 'Agent Scheduler Incorporating Agent Profiles' raises the problem of automatically providing workforce recommendations as for the number of people assigned to answer calls in a call center in a future period of time in order to best match the future call traffic. The idea is to collect daily log of the calls as historical data to forecast the future call traffic. Then the workforce recommendation will be based both on the forecasted data and on the working people and working places capacity.

Similarly, collecting and understanding historical data on endpoints may help in choosing the best time for execution of systems management tasks on endpoints. However, it is needed to define what are the critical data in relation with endpoints and how to use these data to help for systems management task execution.

SUMMARY OF THE INVENTION

It is therefore an object of the present invention to provide a method and system to automatically define execution of systems management tasks on endpoints managed by a systems management server.

It is one other object of the invention to use historical data of endpoints for predicting their probable status and automatically define execution of systems management tasks with a maximum chance of success.

These objects are achieved, as claimed in claim 1, with a method executed on a computer for automatically creating data for defining execution by a systems management server of systems management tasks on distributed endpoints connected to the systems management server, said method comprising the steps of:
reading connection/disconnection information related to the endpoints collected by the systems management server during a period of time;
computing the availability trends with the connection/disconnection information for said period of time;
classifying endpoints according to predefined classes of availability trends for endpoints and the computed availability trends;
applying rules to create data for defining execution of management tasks on endpoints according to the result of the classifying step;
making accessible to the systems management server the created data for defining execution of management tasks on endpoints.

These objects are also achieved with the method according to the claims 2 to 12 depending on claim 1.

These objects are also achieved, according to claim 13, with a computer program product comprising programming code instructions for executing the steps of the method according to any one of claims 1 to 12 when said program is executed on a computer.

These objects are also achieved, according to claim 14, with a system comprising means adapted for carrying out the method according to any one of claims 1 to 12.

Further embodiments of the invention are specified in the appended dependent claims.

This invention resolves the problem of predicting the status of an endpoint in order to prepare execution of systems management tasks by analyzing the usage behavior of the endpoints, and recognizing usage patterns that are representative of their typical use. If the failure to contact a particular endpoint falls within the typical behavior of that endpoint, then it is not considered to be abnormal behavior, and it is not reported to the administrator. If the behavior, on the other hand, is not typical according to historical observed behavior, then it is reported to the administrator in order that action is taken to investigate the anomaly. This allows the administrator to focus only on anomalous behavior.

This invention analyses historical data in order to detect typical endpoint behavior, in terms of when it is active and connected to the management system. It uses several factors to describe this behavior, and applies these factors when looking at the current state of the endpoint to understand whether or not the current state is typical. This allows the background 'noise' of normal endpoint behavior to be filtered out, and highlights only anomalous behavior that requires attention in order to resolve problems or to clean up the registry. This is done for individual endpoints, or for behaviorly-similar groups of endpoints. Endpoints that demonstrate similar behavior can be categorized, and these categories can be used to describe new endpoints that are introduced into the system to allow them to benefit from the management policy without requiring a period of training.

The categorization of endpoints as described in the description of the preferred embodiment allows the implementation of very efficient Inventory scan policies. For instance, all those systems recognized as 'highly available servers' can be scanned periodically at any time except the working hours, while the 'personal workstations' must be scanned during working hours (possibly in off-peak hours, such as the lunch breaks). Finally the 'sporadic use' systems should be scanned as soon as they become active, so in this case the scan must have the highest priority and it should be automatically triggered by the endpoint login.

More generally, the categorization of endpoints, as described in detailed description of the preferred embodiment, results in dynamic groupings that are used to render the management of the system as a whole much more efficient and reliable. Different policies are defined for the different categories in order that the systems management tasks are optimized for each category.

The different disciplines of systems management such as Inventory Scan, Software Distribution, Workload Scheduling and Availability Management benefit from groupings of endpoints into categories which could be, for instance, 'Personal Workstation', Highly Available Server', 'Seasonal Use' and 'Sporadic Use'.

It should be noted that the categories are not limited to the examples cited in the embodiments described in the document, but can be extended and augmented, and made more or less granular, based on the results of the analysis of the endpoint behavior as described previously.

DETAILED DESCRIPTION OF THE PREFERRED EMBODIMENT

Figure 1:
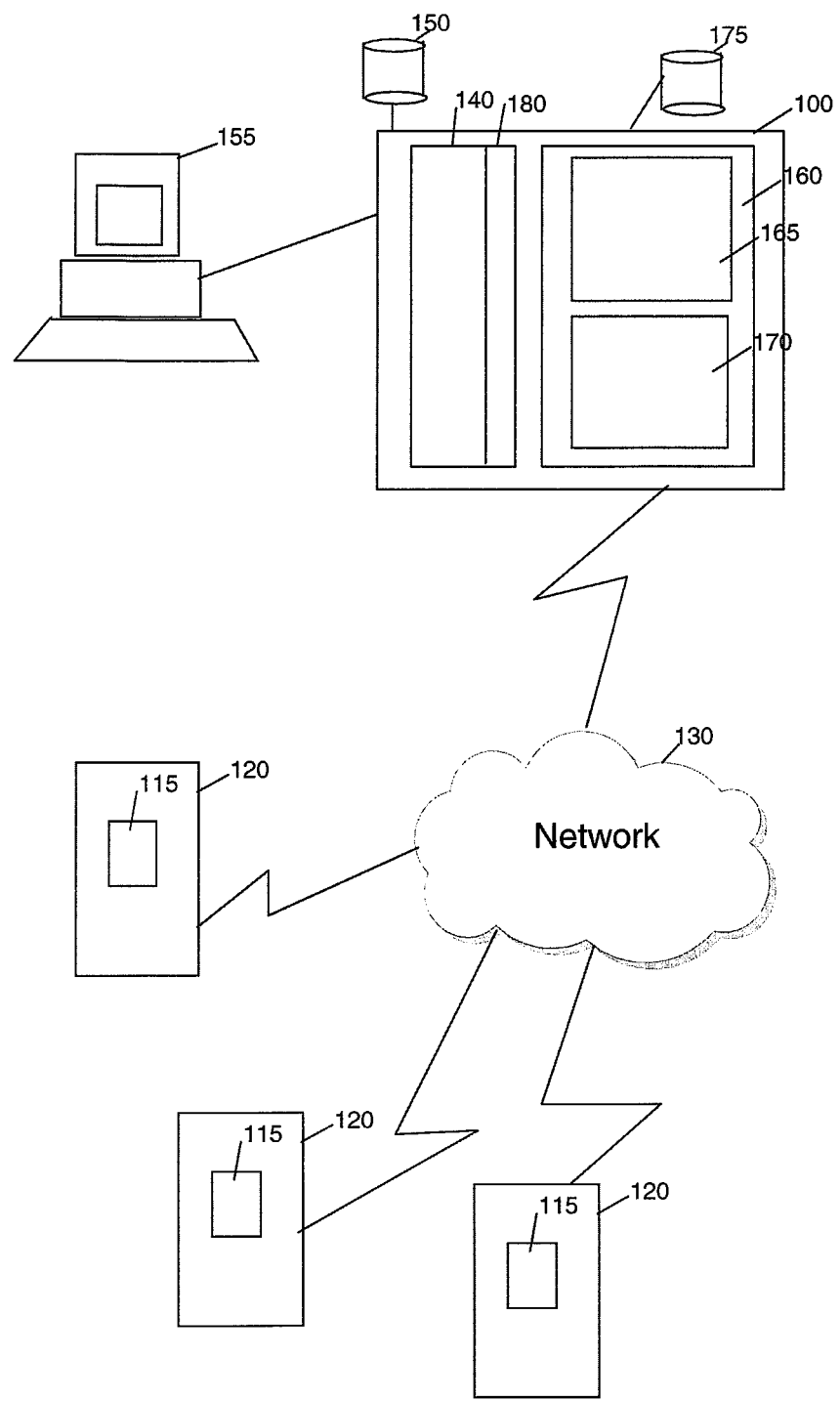
FIG. 1 illustrates a system environment for operating the method of the preferred embodiment.

FIG. 1 illustrates a system environment for operating the method of the preferred embodiment. The preferred embodiment of the invention is implemented in a distributed systems management environment having a Systems Management Server (SMS 100) managing distributed computers, the endpoints (110, 120), which are attached to the SMS (100) through a network (130). On the SMS operates a central Systems Management program (140) which is in communication with agents (115) running on each endpoint in a typical client/server architecture. The communication uses a private protocol over TCP/IP and may be encrypted or not. The SMS is under the control of an Administrator through the Administrator console (155).

The functions of a systems management program in a distributed environment communicates with agents, for collecting agent connection information and storing this information in a Central Log (150) which can be a simple file or a database. The Systems Management program interfaces the Administrator through the Administrator console (155) for displaying alerts and endpoint information it also receives commands from the Administrator for starting/stoping and scheduling workload on endpoints or scheduling software distribution to them.

With the solution of the preferred embodiment, a Classification program (160) operates on the SMS. The Classification program comprises a collector module, so called the Agent Status Collector (165), and an analyzer module, so called the Usage Pattern Analyzer (170).

The Agent Status Collector is in charge of collecting useful information on endpoint in relation with the activity on each endpoint. The information to be collected are those related to the use of the endpoint computer. These information can be extracted with a batch job from the Central Log file or database of the Systems Management program or, can be collected dynamically and periodically with a never ending background process. Preferably, the information extracted or directly collected by the Agent Status Collector is stored in a Historical database (175).

A second module of the Classification program is the Usage Pattern Analyzer. The Usage Pattern Analyzer is in charge of interpreting the historical data collected by the Agent Status Collector and to provide processed data for the Systems management program to prepare systems management task execution data. The Usage Pattern Analyzer is executed on a periodic basis, preferably each week. It reads information in the Historical database, processes them and creates classification of endpoints into groups corresponding to different use behavior and which will correspond to different policies for execution of systems management tasks.

Optionally, the Usage Pattern Analyzer can detect the change in the use behavior of an endpoint and can execute tasks in response to a particular change, like sending an alert to the Administrator console or removing the endpoint itself from the list of managed systems. The tasks executed by the Usage Pattern Analyzer, when a change occurs, are listed in a table, the Usage Variation Task table described later in the document in relation with the description of FIG. 2 that can be modified by the Administrator. In the real environment, the Administrator will check the reason for this change which could be a real change in the use of an endpoint system by its users or a failure to be further investigated.

With the solution of the preferred embodiment, the Systems Management program (140) is enriched with a new module, the Apply Policy program (180) able to read the classification results provided by the Usage Pattern Analyzer and apply policies in relation with the classification to automatically create systems management task execution data. Then, the Systems Management program starts the execution of the tasks either automatically or upon the Administrator request as usual.

Figure 2:
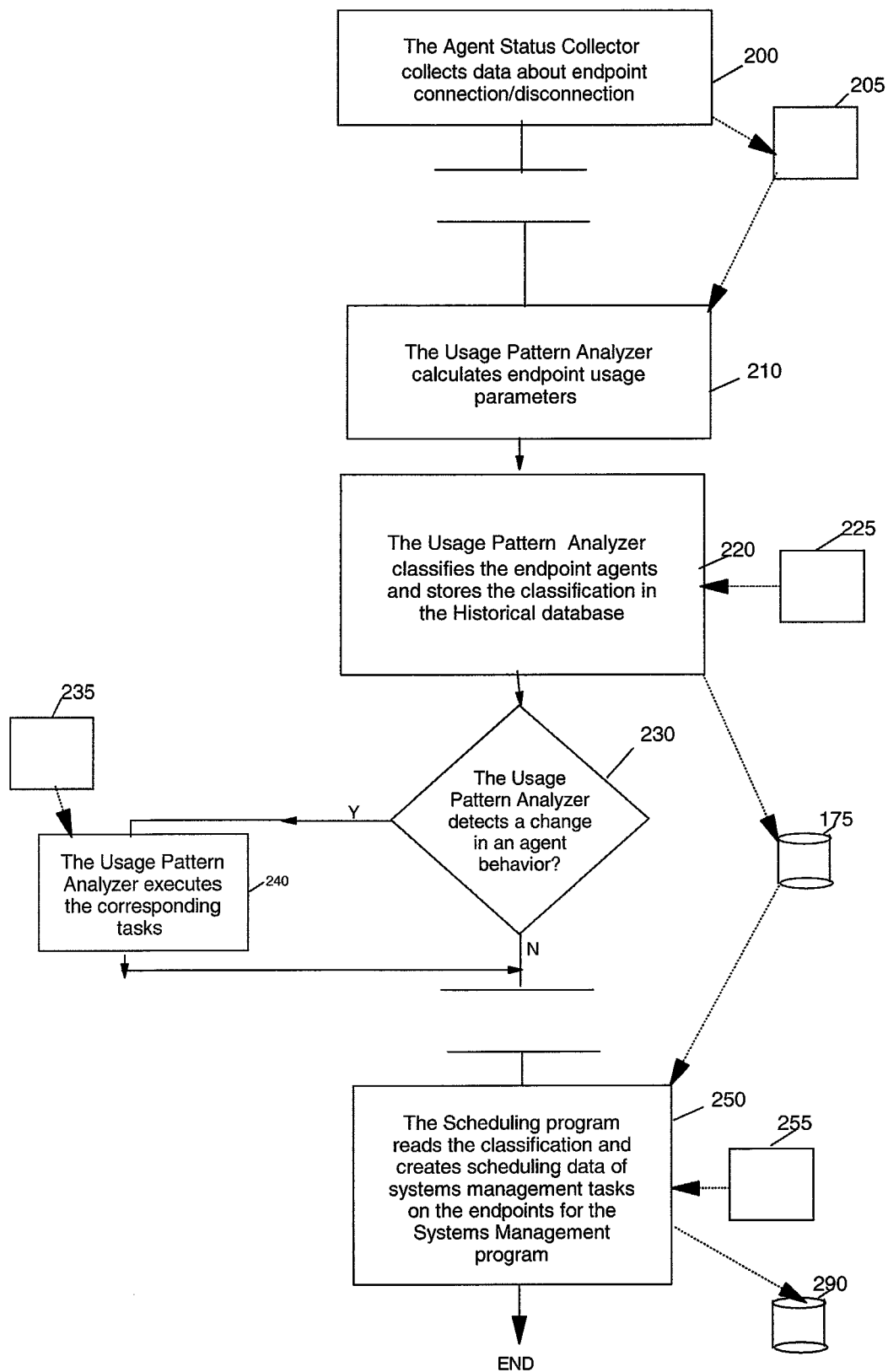
FIG. 2 is the general flowchart of method of the preferred embodiment.

FIG. 2 is the general flowchart of method of the preferred embodiment. In a first step (200) the Agent Status Collection program collects information on the availability of the endpoints and populates a table with the connection status of each managed agent. The Agent Status Collector, using the services of the central Systems Management program, checks each agent status on a periodic basis and stores in the Agent Status table (205) the connection status of each managed agent. An example of Agent Status table is provided hereunder, with the agent status obtained by pinging the agent on an hourly basis.

Agent Status Table:

| Timestamp | Agent | Status |
| --- | --- | --- |
| 01-01-2005 00:00 | agent1 | Disconnected |
| 01-01-2005 00:00 | agent2 | Disconnected |
| ... | ... | ... |
| 01-01-2005 01:00 | agent1 | Connected |
| 01-01-2005 01:00 | agent2 | Disconnected |
| ... | ... | ... |
| 01-01-2005 02:00 | agent1 | Disconnected |
| 01-01-2005 02:00 | agent2 | Connected |
| ... | ... | ... |

An alternative way of collecting agent status data is to read, independently from the Systems Management program, this information in the Central Log (150) of the Systems management program:

Agent Status Table: (205)

| Timestamp | Agent | Registered Event |
|---|---|---|
| 01-01-2005 00:12 | agent1 | Connection |
| ... | ... | ... |
| 01-01-2005 01:45 | agent2 | Connection |
| ... | ... | ... |
| 01-01-2005 01:47 | agent1 | Disconnection |
| ... | ... | ... |

Periodically, on a weekly basis for instance, the Usage Pattern Analyzer reads the Agent Status table to calculate (210) relevant parameters for the observation period. In the preferred embodiment these parameters are the max_connection_time and the connection_ratio computed as follows:

connection_ratio=(total connection time)/(total disconnection time)

Then, the Usage Pattern Analyzer classifies (220) the agent according to classes of activity predefined in the following table:

Usage Pattern Classification Table (225)

| Measured values | Classification |
|---|---|
| connected_ratio > 1<br>max_connection_time > 24 h | High Availability Server (HAS) |
| 0, 1 < connected_ratio < 1<br>4 < max_connection_time < 24 h | Personal Workstation (PW) |
| Connected_ratio = 0<br>max_connection_time = 0 | Disconnected Agent (DA) |
| all other values | Sporadic Use (SU) |

The agent classification data output of the Usage Pattern Analyzer Program is stored in a Historical database (175) as shown below:

Historical Database Record:

| Observation period | Agent | Classification |
|---|---|---|
| Week 1 | agent1 | High Availability Server (HAS) |
| Week 1 | agent2 | Personal Workstation (PW) |
| ... | ... | ... |
| Week 2 | agent1 | High Availability Server (HAS) |
| Week 2 | agent2 | Sporadic Use (SU) |
| ... | ... | ... |

Optionally, the Usage Pattern Analyzer may perform (240), on the basis of the result of the classification obtained in the preceding step, some tasks already predefined in a table, the Usage Variation Task table (235). As an example, the Usage Pattern Analyzer compares the current classification of each agent with the one calculated in the previous observation periods. In case of any variation detected by the Usage Pattern Analyzer, (answer Yes to test 230), the Usage Pattern Analyzer executes (240) the tasks specified in the Usage Variation Task table:

Usage Variation Tasks Table (235)

| DETECTED VARIATION<br>(between the previous classification and the current classification) | TASK |
|---|---|
| HAS has become PW or SU or DA | Notify the Administrator |
| DA has stayed DA | Go back into the Historical database and find the last observation period (LOB) in which the agent was not classified as DA:<br>if the agent was HAS<br>OR<br>if the agent was PW and LOB older than 3 weeks ago<br>OR<br>if the agent was SU and LOB older than 12 weeks ago<br>THEN<br>Notify the Administrator and/or automatically delete the agent from the list of managed items) |
| All other cases | Do nothing |

Before execution of systems management tasks, the Apply Policy program (180) processes (250) the data created in the historical database by the Usage Pattern Analyzer and periodically, preferably with the same period used by the Usage Pattern Analyzer (for instance one week), checks the current classification of the agent in the Historical database and applies management policies predefined (for instance by the Administrator) in a Management Policy table (255) to automatically prepare data for systems management task execution. The Apply Policy program may use a program, as it exists in the art, able to interpret policies written in a predefined syntax. An example of a technology for interpreting policy is in the IBM Tivoli Enterprise Console (TEC) product. TEC collects events that are sent from other system elements and reads the rules describing what actions to take when predefined combinations of events are received. TEC interprets rules expressed in a language called Prolog. Any program able to define and interpret rules such as TEC is convenient for the execution of the Apply Policy program. One example of a Management policy table could be:

Management Policy Table (255)

| Agent Classification | Applied Management Policy |
|---|---|
| High Availability Server (HAS) | distribute, execute tasks and collect data at fixed times during not working hours (nights & weekends)<br>low priority operations<br>best candidate to run jobs with a large expected duration |
| Personal Workstation (PW) | distribute, execute tasks and collect data at fixed times during working hours (preferably in off-peak hours, such as the lunch breaks)<br>medium priority operations<br>can run jobs with a medium expected duration |
| Sporadic Use (SU) | distribute, execute tasks and collect data as soon as the agent connects<br>high priority operations<br>can only run jobs with a short expected duration |

| Agent Classification | Applied Management Policy |
| --- | --- |
| Disconnected Agent (DA) | Same policies applied to SU agents, as long as the agent is not deleted from the list of managed items (see the Task in the Usage Variation Task table) |

It is noted that the Management Policy Table (255) may contain task execution data for different domains such as Workload Scheduling, Availability management or Software distribution. For Availability management, one policy could consist in setting different thresholds for sending alerts in case of system unavailability: if a system is classified as "high available" the threshold is low (e.g. 1 hours of unavailability), if a system is classified as "personal workstation" the threshold is higher (e.g. 15 days).

The data in output of the Apply Policy program (180) could be a file, the Apply Policy data file (290). The data for systems management tasks in relation with workload scheduling on endpoints consist in the date, time, identifier of endpoint and systems management task identifier to be started on the endpoint. The Systems management program will get this data automatically as an output of the Apply Policy program as it get the same information in the commands entered by the Administrator on the Administrator console.

The Apply Policy program may provide a Apply Policy data file (290) in a language directly understandable by the Systems Management program. Then, the execution of tasks on endpoints is started, as usual, by the Systems Management program. It is noted that the Administrator can review and override files containing Systems management tasks data as he does with the existing Systems management program through the Systems management program user interface.

As a feedback loop, the Administrator who is responsible for defining the tables, particularly the content of the Usage Pattern Classification table (225) and the Management Policy table (255), can tune the content of these tables according the success of the systems management tasks executed on the endpoints.

Figure 3:
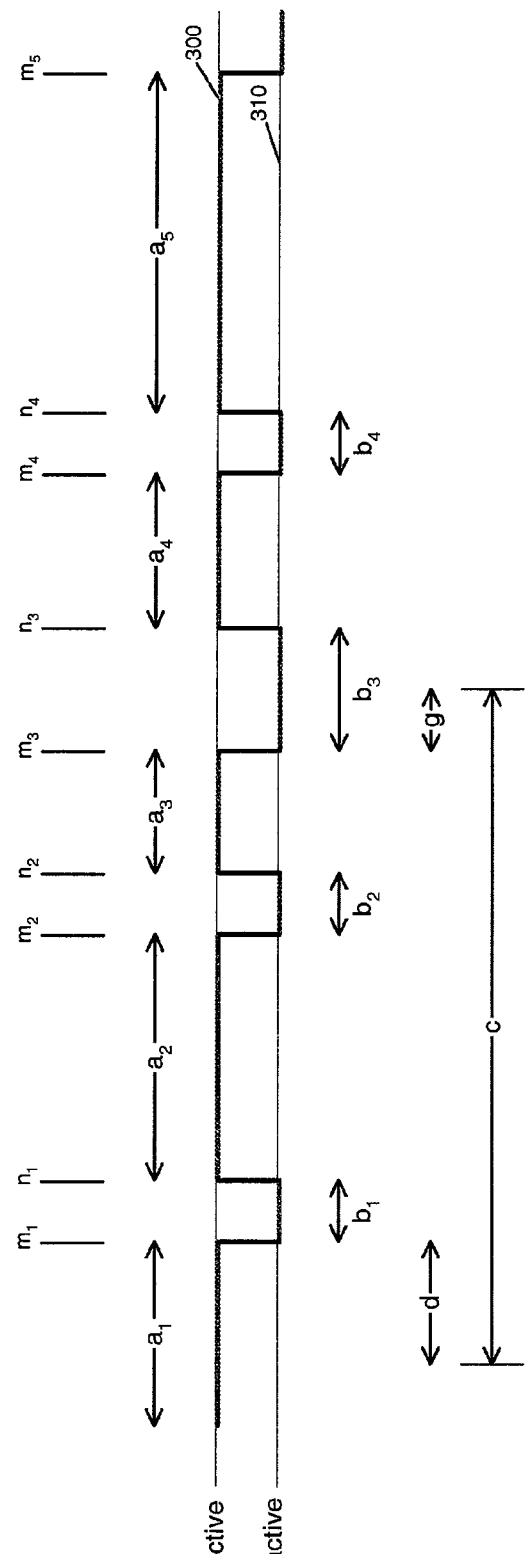
FIG. 3 shows a graph which, using logged data about endpoint, illustrates when an endpoint is connected according to the preferred embodiment.

FIG. 3 shows a graph which, using logged data about endpoint, illustrates when an endpoint is connected. Information about when an endpoint is connected to the management system is logged and stored in a Agent status table. This information, viewed over time, can be summarized for each endpoint by a graph comprising two states as illustrated in FIG. 3: Active (300) and Inactive (310). By reading that graph, a number of measurements can be made in order to obtain some factors that categorize the behavior of the endpoint over time which are illustrated also in this FIG. 3.

Measurement a ($a_1$, $a_2$, $a_3$, $a_4$, $a_5$) represents each individual period of connection to the management system.

Measurement b ($b_1$, $b_2$, $b_3$, $b_4$) represents each individual period of disconnection to the management system.

Measurement c represents a period of observation pertinent to the type of categorization required. For example, a day, a week, a year.

Measurement d represents the period of connection time from the beginning of the observation period (c) to the first disconnect within the observation period.

Measurement e (not shown) represents the period of connection time from the last connect within the observation period to the end of the observation period.

Measurement f (not shown) represents the period of disconnection time from the beginning of the observation period to the first connect within the observation period.

Measurement g represents the period of disconnection time from the last disconnect within the observation period (c) to the end of the observation period.

The time m ($m_1$, $m_2$, $m_3$, $m_4$, $m_5$) represents the time at which a disconnect took place (or was discovered).

The time n ($n_1$, $n_2$, $n_3$, $n_4$) represents the time at which a disconnect took place (or was discovered).

Other factors can be derived from the above measurements:

The time between successive connects, tconnect, is $n_i - n_{i-1}$.

The time between successive disconnects, tdisconnect, is $m_i - m_{i-1}$.

The ratio of connected time to disconnected time (connect_ratio) during an observation period (c) is $(d + a_1 + \ldots a_n + e)/(f + b_1 + \ldots + b_n + g)$.

Figure 4:
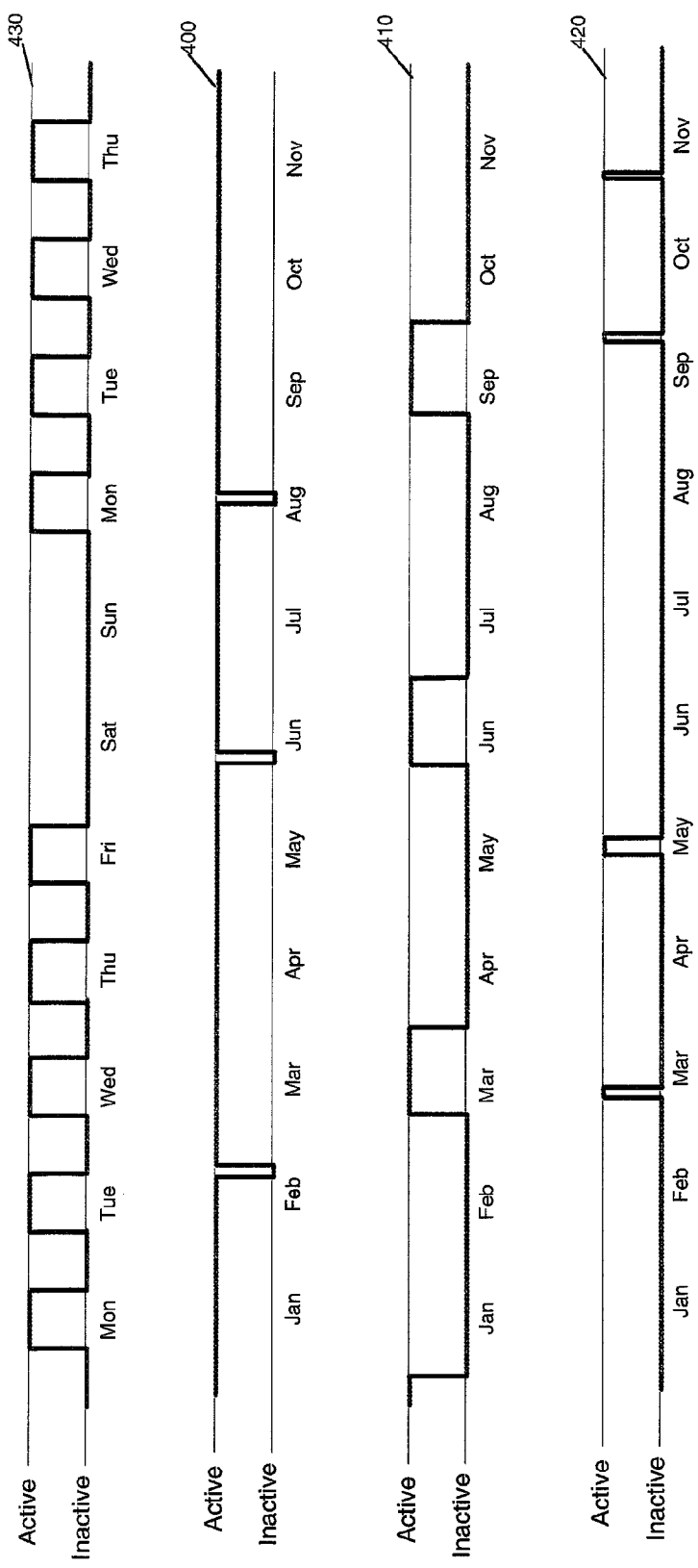
FIG. 4 shows graphs illustrating the availability periods for different categories of endpoints according to the preferred embodiment according to the preferred embodiment.

FIG. 4 shows graphs illustrating the availability periods for different categories of endpoints. These graphs show some examples of what might result to be usage patterns.

Personal Workstation (430)

The usage pattern shows a very regular use of the computer on weekdays. In fact tconnect=1 day, and tdisconnect=1 day during weekdays. Total connection time each week is $a_1 + a_2 + a_3 + a_4 + a_5 = 60$ hours. The ratio of connected to disconnected time, connect_ratio=60/108=0.56.

Highly Available Server (400)

This computer has very high availability characteristics. It is generally connected, and disconnects only a few times during the year. tdisconnect may be around 3 months on average, and may not necessarily be regular. Total connection time per observation period will tend towards the total elapsed time of the observation period (c). connect_ratio will be very high.

Seasonal Use (410)

This computer shows regular and repeating availability periods, even if it is generally not connected. tconnect is regular. Total connection time per observation period (c) will tend to low as c increases. connect_ratio will not be very high when measured over long observation periods.

Sporadic Use (420)

This computer has a very low connection time within significant observation periods. tconnect is unpredictable. This type of computer is activated to reproduce specific customer problems, or to do regression testing on particular platforms.

Figure 5A:
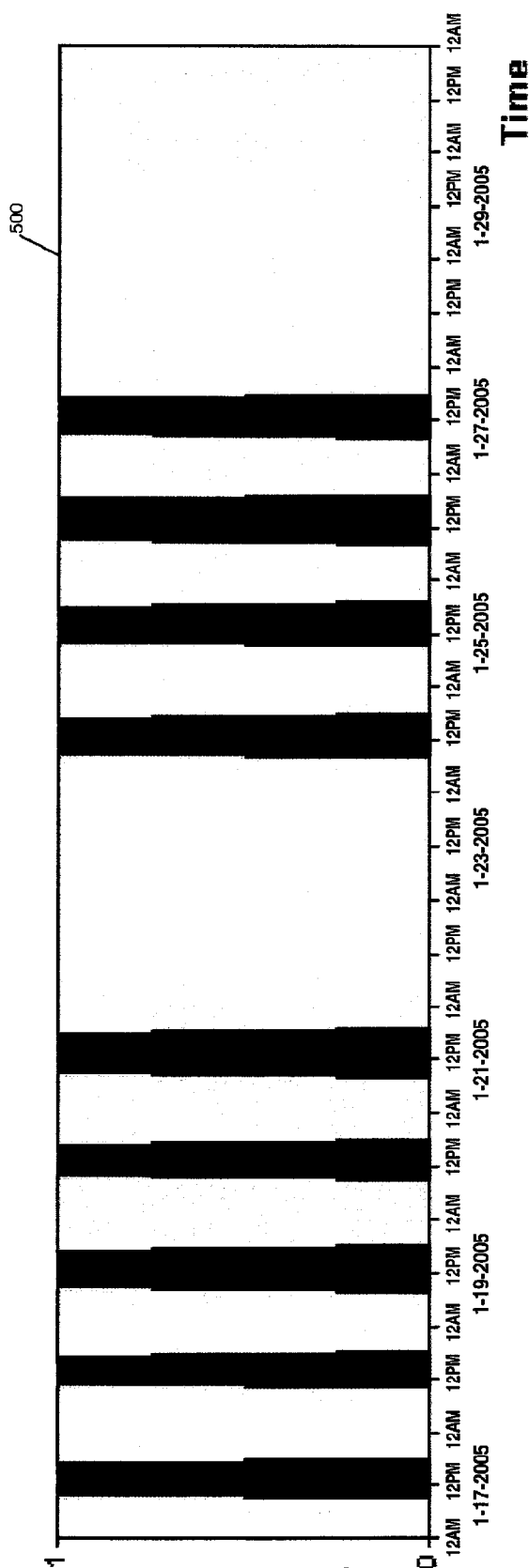
FIG. 5 (5A, 5B, 5C) shows diagrams of some real-life examples of usage patterns measured for some endpoints belonging to some endpoint categories as defined according to the preferred embodiment.
Figure 5B:
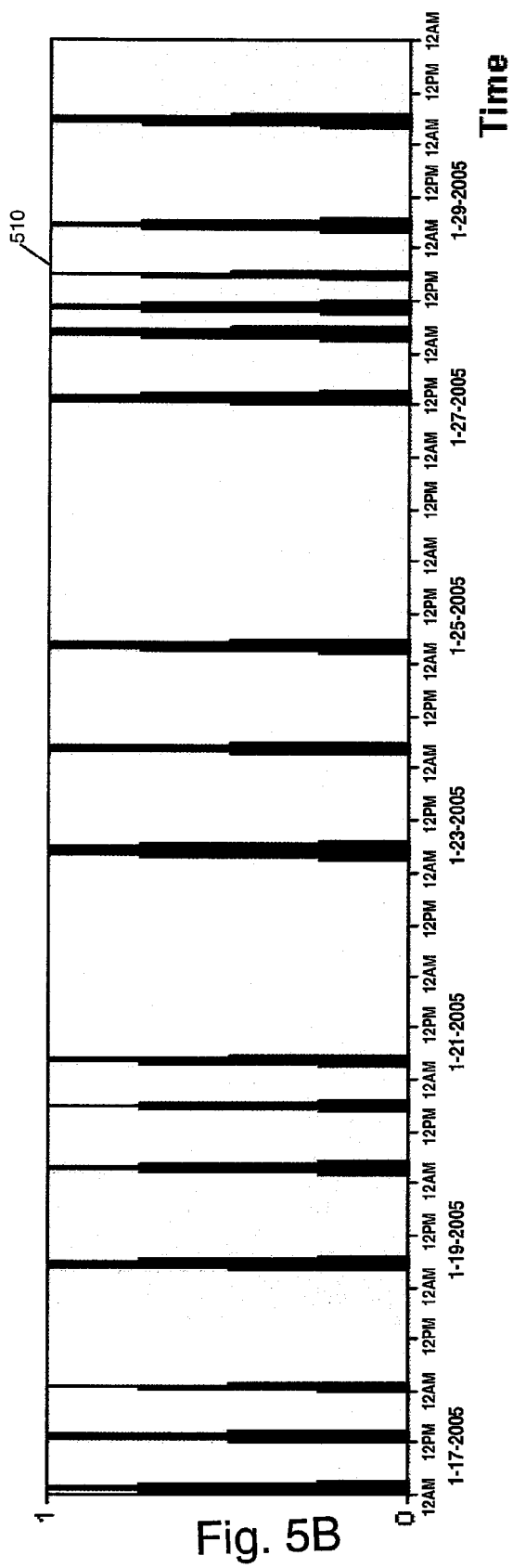
Figure 5C:
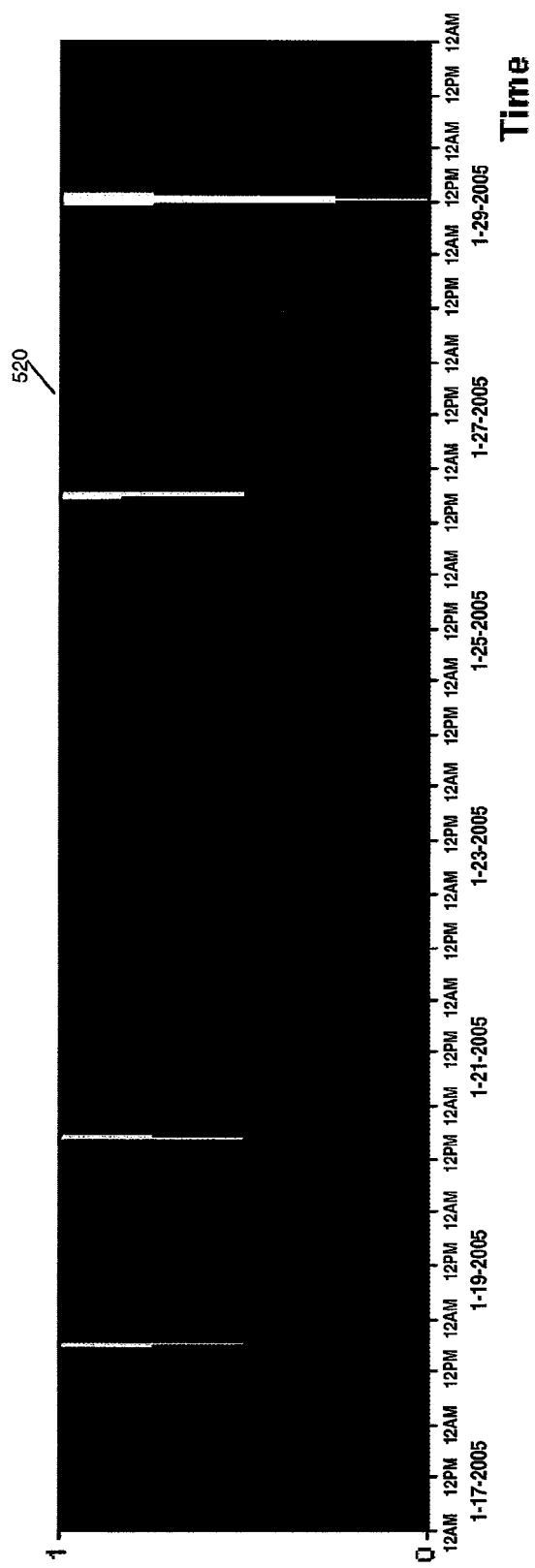

FIG. 5 (5A, 5B, 5C) shows diagrams of some real-life examples of usage patterns measured for some endpoints belonging to some endpoint categories as defined.

Personal Workstation

The curve (500) shows the very regular use of the computer on weekdays. The workstation monitored in FIG. 5 was not active on the second Friday of the observation period, perhaps due to the owner being in vacation.

Highly Available Server

The curve (520) shows the very high availability characteristics of this system which is connected, and disconnects only a few times during the year.

Sporadic Use

The curve (510) shows the low connection time appearing from time to time.

Figure 6A:
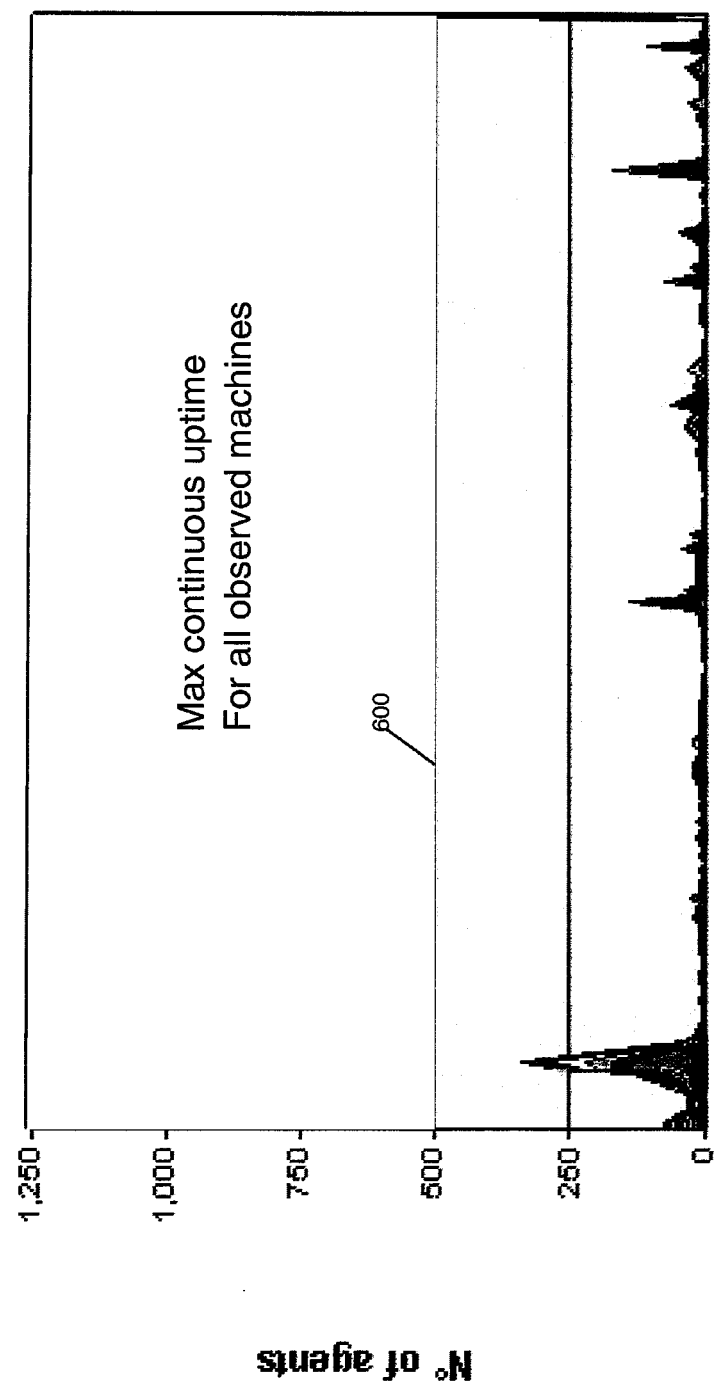
FIG. 6 (6A, 6B, 6C) shows the data obtained in a real environment when measuring the maximum continuous uptime of the endpoints according to the preferred embodiment.
Figure 6B:
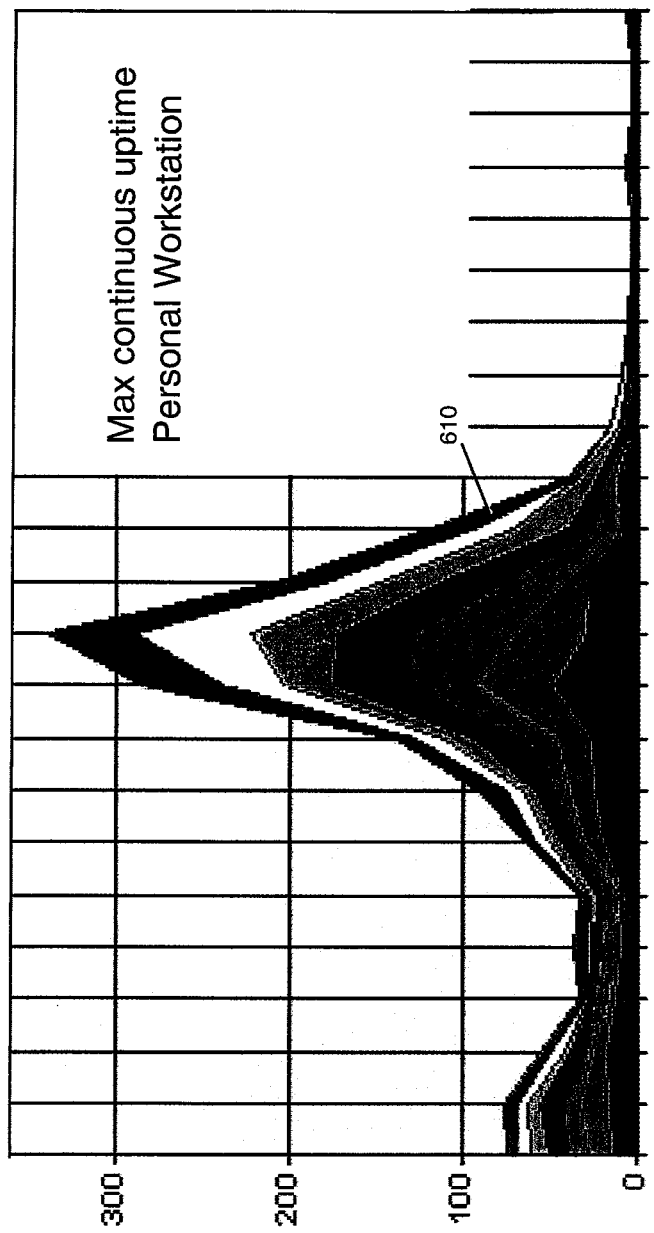
Figure 6C:
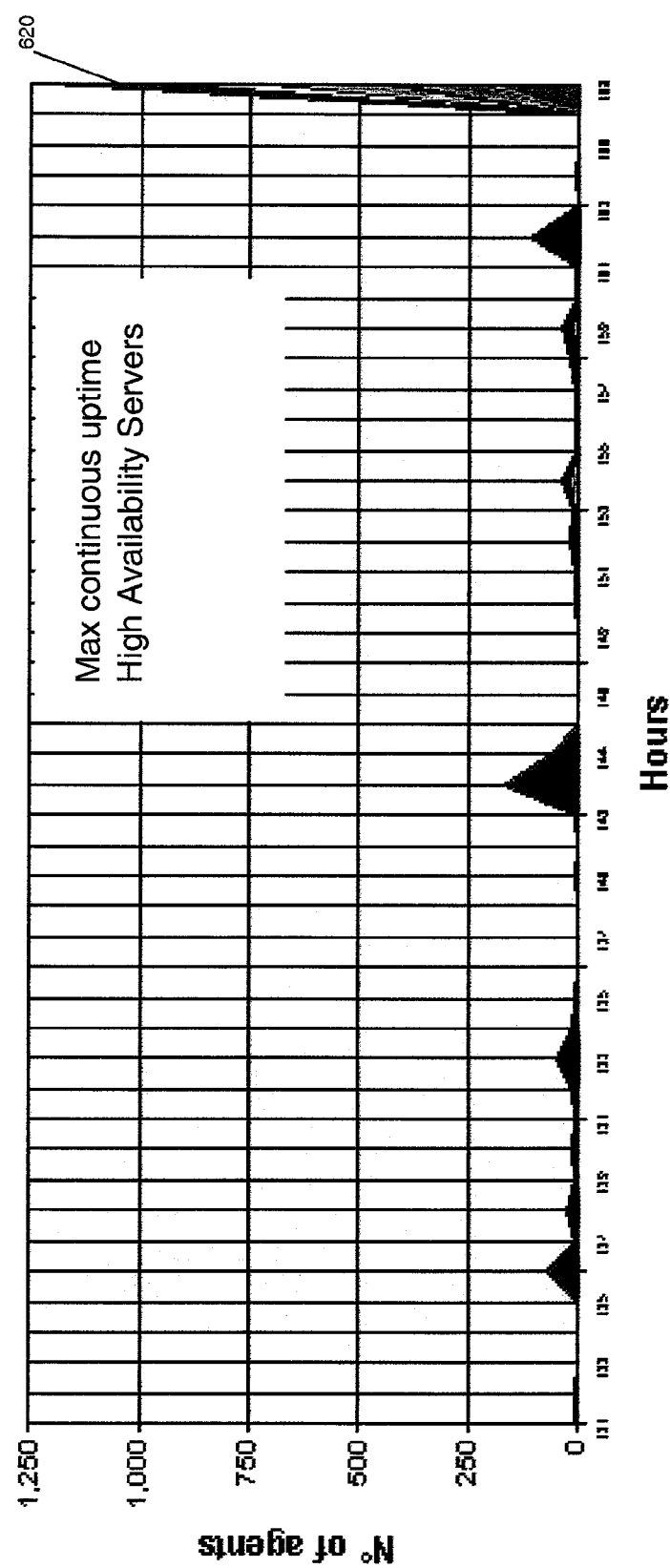

FIG. 6 (6A, 6B, 6C) shows the data obtained in a real environment when measuring the maximum continuous uptime of the endpoints, that is the longest period of connection to the management system in a fixed observation period (1 week=168 hours).

The first curve (600) displays the entire distribution of the maximum value of the measurements a for all the observed machines. This distribution has one big peak around a=10 hours and another at the end of the observation period (a=168 hours).

The next curve (610) is a zoom of the curve (600) around its peak at 10 hours: all the endpoints with a measurement a in this range can be typically classified as 'personal workstation'.

The next curve (620) is a zoom of the curve (600) at the end of the observation period (168 hours): all the endpoints with a measurement in this range can be typically classified as 'highly available server'.

Figure 7:
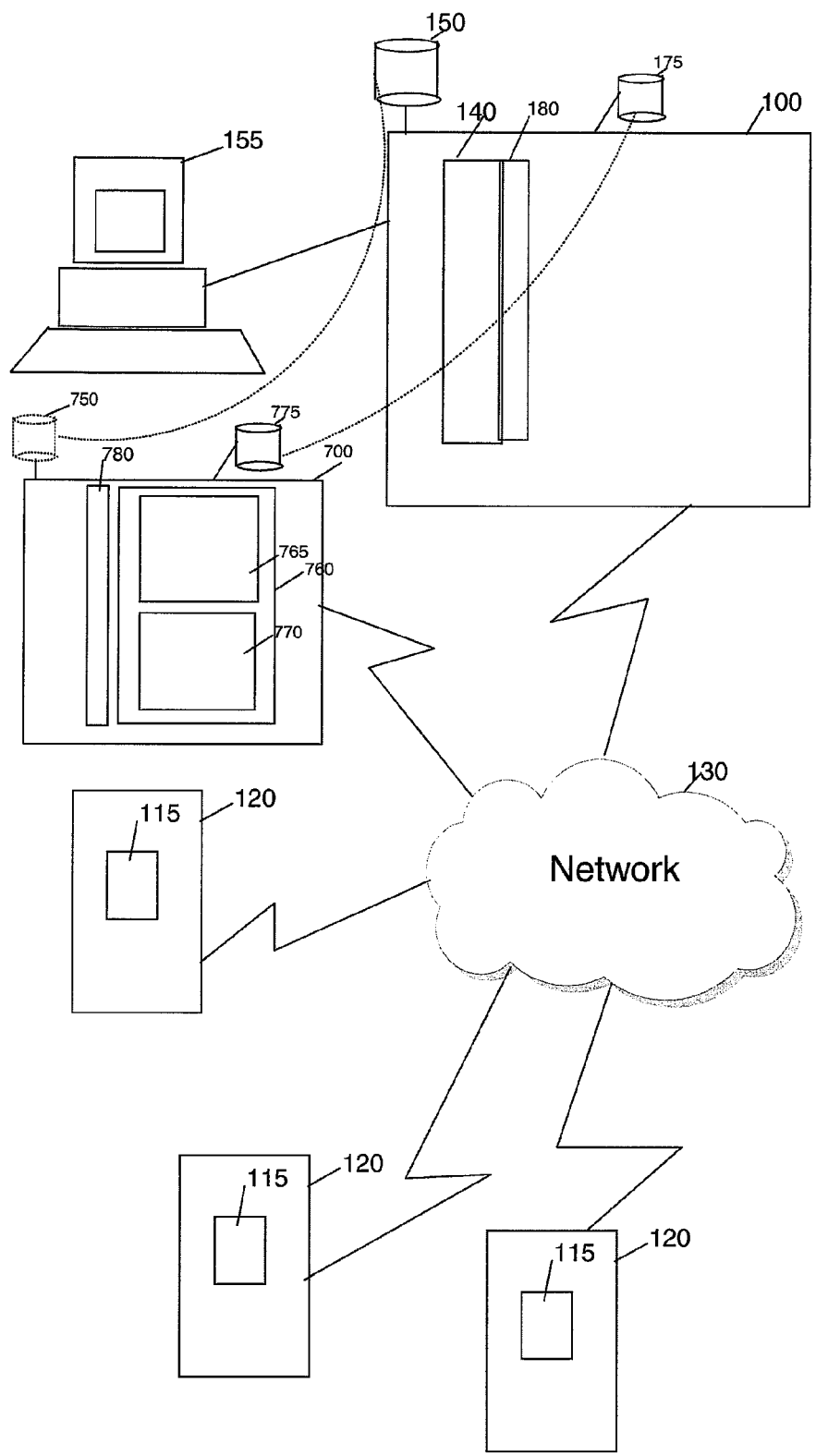
FIG. 7 illustrates the system environment for operating the method of the invention implemented as a service.

FIG. 7 illustrates the system environment for operating the method of the invention implemented as a service. A Systems Management Servers (100) will use the service of a Service Team Server (700) to obtain the optimum systems management task execution data for use at its endpoints. As with the centralized solution of the preferred embodiment, the central Systems Management Server (100) executes, according to the computed systems management task execution data, the systems management tasks on the endpoints (110) connected through the network (130). On each endpoint an agent (115) is activated and communicates with the systems management program (140) operating on the SMS. In a client server environment, the Systems Management program of the SMS, acting as a client, communicates through the network (130) with the Service Team Server (700) programs which act in Server mode for the Systems Management program. Similarly with the centralized preferred embodiment, a Classification program (760) comprising an Agent Status Collector (765) and a Usage Pattern Analyzer (770) programs operates on the Service team server.

According to one embodiment, the Systems Management program access the Service Team Server to request that its endpoint be classified. On the Service Team Server (750), the Classification Program (760) does not collect endpoint information itself but rather accesses the Central Log (150) of the Systems Management program on the Systems Management Server. The classification data stored by the Classification program in a Historical database (775) as with the centralized solution are sent to the Systems Management Server. The historical database is maintained by the Classification program on the Service Team Server. The Apply Policy program (180) installed on the Systems Management Server uses the Historical database data to generate information for execution of systems management tasks on the endpoints. In this embodiment no Apply Policy program (780) is installed on the Service Team Server. The Service Team Server is used for providing classification of endpoints to systems management server which are able to use this classification to generate those data for execution of systems management tasks created by any of the embodiments described.

In a second embodiment of the invention as a service, the Apply Policy program (780) is executed on the Service Team Server (750), for creating the systems management task execution data that it sends to the Systems Management program on the Systems Management Server from which will be started execution of the systems management tasks on the endpoints accordingly. In this embodiment, no Apply Policy program (180) is installed on the Systems Management Server. The Service Team Server is used for providing data for execution of systems management tasks to the Systems Management Server subscribing for this service.

Figure 8:
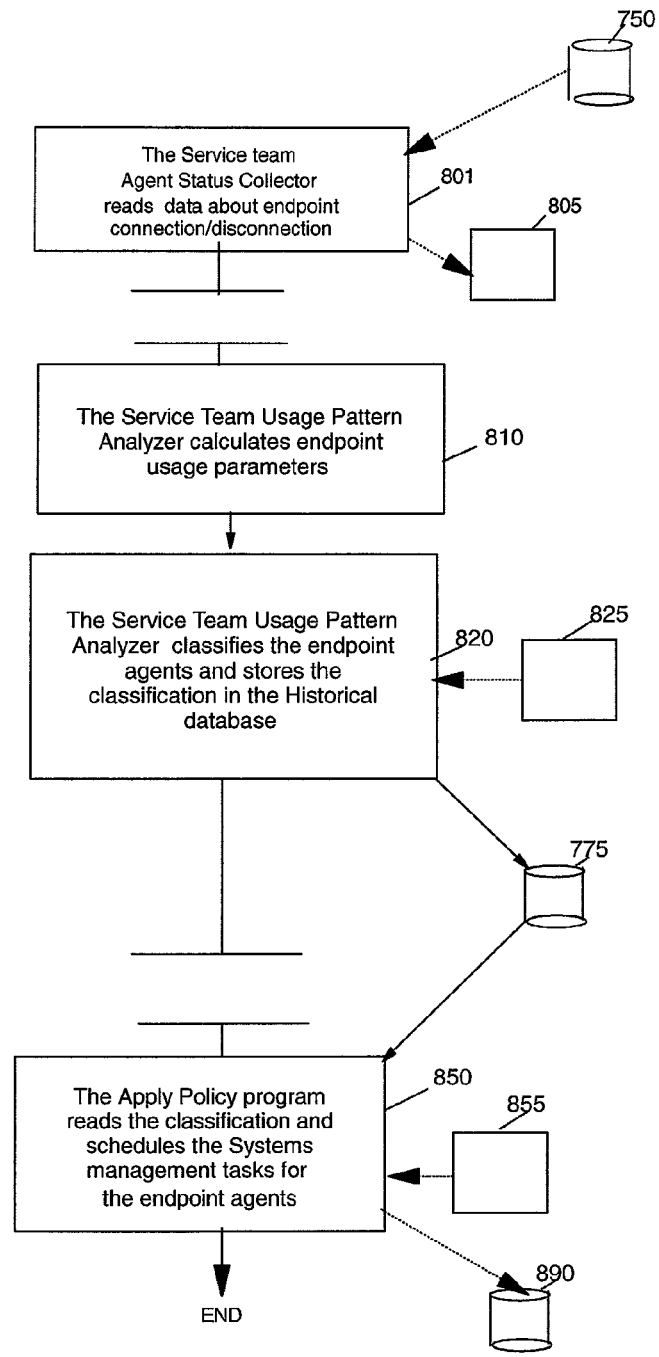
FIG. 8 is the general flowchart of method of the invention implemented as a service.

FIG. 8 is the general flowchart of method of the invention implemented as a service. Not represented in FIG. 8, in an initial step, the SMS sends a request to the Service Team Server to provide data for execution of systems management tasks in one embodiment or simply endpoint classification data in a second embodiment of the invention as a service. The Agent Status Collection program (765) located on the Service Team Server gets a copy (750) of the Central Log (150) located on the SMS, reads (801) the connection data of the endpoint and populates a table, the Agent Status table (805) with the connection status of each managed agent. The Agent Status table is the same as with the centralized solution of the preferred embodiment but is located on the Service Team Server.

Periodically, on a weekly basis for instance, the Usage Pattern Analyzer located on the Service Team Server (770) reads the Agent Status table to calculate (810) relevant parameters for the observation period. Then, the Usage Pattern Analyzer (770) located on the Service Team Server classifies (820) the agent according to classes of activity predefined in the Usage Pattern Classification Table (825) located on the Service Team Server. The Usage Pattern Classification table may be the same than with the centralized solution of the preferred embodiment. The agent classification data created by the Usage Pattern Analyzer Program is stored in a Historical database (775) which may be the same than with the centralized solution of the preferred embodiment and which is located on the Service Team Server.

In the first embodiment of the invention as a service, the Apply Policy program (780) located on the Service Team Server processes (850) the data created in the historical database (775) by the Usage Pattern Analyzer and periodically, preferably with the same period used by the Usage Pattern Analyzer (for instance one week), checks the current classification of the agent in the Historical database and applies management policies predefined (for instance by the Administrator) in a Management Policy table (855) to automatically prepare systems management task execution data. The Management Policy table may be the same than with the centralized solution of the preferred embodiment but is located on the Service Team Server. As with the centralized solution, the Apply Policy program uses a program, as it exists in the art, able to interpret policies written in a predefined syntax. An example of a technology for interpreting policy is in the IBM Tivoli Enterprise Console (TEC) product. TEC collects events that are sent from other system elements and reads the rules describing what actions to take when predefined combinations of events are received. TEC interprets rules expressed in a language called Prolog. Any program able to define and interpret rules such as TEC is convenient for the execution of the Apply Policy program.

The Apply Policy program provides in output data for scheduling of tasks, preferably in a Apply Policy data file (890) in a language understandable by the Systems Management program. In an ultimate step, not represented in FIG. 8, the Apply Policy program sends (860) the Apply Policy data file (890) to the SMS. The SMS will perform the execution of the systems management tasks on its endpoints according to data received from the Service Team Server. As with the centralized solution, the Administrator can review and override a file containing the systems management task execution data as he does with the existing Systems management program through the Systems management program user interface.

As a feedback loop, it is noted that the service team specialist responsible for scheduling optimization and internal table definition particularly the content of the Usage Pattern Classification table (825) and the Management Policy table (855), can tune the content of these tables according the success of the feedback provided by the SMS sites about systems management tasks executed on the endpoints.

When the invention is implemented according the second embodiment of the invention as a service, the SMS sends an initial request to the Service Team Server, not represented in FIG. 8, to provide endpoint classification data to the Systems Management program operating on the SMS for execution of systems management tasks. The Classification program (760) on the Service Team server operates as in the first embodiment of the invention as a service to create the endpoint classification. Ultimately, the Classification program (760) sends the classification data stored in the Historical database (775) to the SMS.

In the second embodiment of the invention as a service, the Apply Policy program (180) is located on the Systems Management Server, it processes (850) the classification data sent by the Service Team server and creates in output data may be in a file (290) for execution of systems tasks on the endpoints in a language understandable by the Systems Management program. The Apply Policy program (180) applies the management policies predefined (for instance by the Administrator) in a Management Policy table (255) to automatically prepare systems management task execution data. The Management Policy table may be the same than with the centralized solution of the preferred. On the SMS, the Systems Management program then performs the execution of the systems management tasks on its endpoints according to data created by the Apply Policy program.

The invention claimed is:

1. A method executed on a computer for automatically defining execution by a systems management server of systems management tasks on distributed endpoints connected to the systems management server, the method comprising:
   reading connection/disconnection information related to the endpoints collected by the systems management server during a period of time;
   computing availability trends with the connection/disconnection information for the period of time, wherein computing availability trends comprises computing a connection ratio and a maximum connection time;
   classifying the endpoints according to predefined classes of availability trends for the endpoints based on the computed availability trends;
   applying rules to generate data for defining execution of systems management tasks on the endpoints according to the result of the classifying step;
   defining execution of systems management tasks on the endpoints based on the generated data.

2. The method of claim 1 further comprising:
   predefining classes of availability trends for the endpoints;
   predefining rules for defining execution of systems management tasks on the endpoints.

3. The method of claim 1 wherein applying rules comprises applying rules in relation with workload management of the endpoints to create data for scheduling jobs to be executed on the endpoints.

4. The method of claim 1 wherein applying rules comprises applying rules in relation with systems availability of the endpoints to create data for monitoring the availability of the endpoints.

5. The method of claim 1 wherein applying rules comprises applying rules in relation with software distribution on the endpoints to create data for scheduling distribution of software to the endpoints.

6. The method of claim 1 wherein agents operating on the endpoints collect the connection/disconnection information and the computer stores the connection/disconnection information in a historical database accessible by the computer.

7. The method of claim 1 wherein a service team server computer executes the reading, computing, classifying and applying steps; and
   wherein the service team server computer sends to a systems management server computer the data for defining execution of systems management tasks on endpoints such that the systems management server computer defines execution of the systems management tasks on the endpoints.

8. The method of claim 1 wherein computing a connection ratio comprises dividing a total connection time by a total disconnection time.

9. The method of claim 1 wherein classifying the endpoints comprises classifying the endpoints based on connection ratio and maximum connection time.

10. The method of claim 1 wherein the predefined classes of availability trends comprise high availability server, personal workstation, disconnected agent, and sporadic use.

11. A computer program product in a non-transitory computer readable storage medium having programming code instructions stored thereon for causing a computing device to:
   read connection/disconnection information related to the endpoints collected by the systems management server during a period of time;
   compute availability trends with the connection/disconnection information for the period of time, wherein computing availability trends comprises computing a connection ratio and a maximum connection time;
   classify the endpoints according to predefined classes of availability trends for the endpoints based on the computed availability trends;
   apply rules to generate data for defining execution of systems management tasks on the endpoints according to the result of the classifying step; and
   define execution of systems management tasks on the endpoints based on the generated data.

12. The computer program product of claim 11 wherein computing the connection ratio comprises dividing a total connection time by a total disconnection time.

13. The computer program product of claim 12 wherein classifying the endpoints comprises classifying the endpoints based on connection ratio and maximum connection time.

14. The computer program product of claim 11 wherein the predefined classes of availability trends comprise high availability server, personal workstation, disconnected agent, and sporadic use.

15. A system for defining system management tasks for a set of endpoints comprising:
   a first server computer connected to the set of endpoints through a network for reading, from a historical database, connection/disconnection information related to the endpoints collected during a period of time, computing availability trends with the connection/disconnection information for the period of time, wherein computing availability trends comprises computing a connection ratio and a maximum connection time, and classifying endpoints according to predefined classes of availability trends for endpoints based on the computed availability trends; and a second server computer for applying rules to generate data for defining execution of system management tasks on the endpoints according to the result of the classifying step, and define execution of system management tasks on the endpoints based on the generated data.

16. The system as recited in claim 15, wherein a single system management server computer system embodies the first server computer and the second server computer.

17. The system as recited in claim 15, wherein a service team server computer embodies the first server computer and a system management server embodies the second server computer.

* * * * *